(12) United States Patent
Das Gupta et al.

(10) Patent No.: US 11,120,343 B2
(45) Date of Patent: Sep. 14, 2021

(54) INTELLIGENT ANOMALY IDENTIFICATION AND ALERTING SYSTEM BASED ON SMART RANKING OF ANOMALIES

(71) Applicant: CISCO TECHNOLOGY, INC., San Jose, CA (US)

(72) Inventors: Aparupa Das Gupta, San Jose, CA (US); Rahul Ramakrishna, San Jose, CA (US); Yathiraj B. Udupi, San Jose, CA (US); Debojyoti Dutta, Santa Clara, CA (US); Manoj Sharma, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1060 days.

(21) Appl. No.: 15/152,379

(22) Filed: May 11, 2016

(65) Prior Publication Data
US 2017/0330096 A1 Nov. 16, 2017

(51) Int. Cl.
*G06N 5/04* (2006.01)
*G06N 5/02* (2006.01)
*G06F 11/30* (2006.01)

(52) U.S. Cl.
CPC ............ *G06N 5/025* (2013.01); *G06F 11/30* (2013.01)

(58) Field of Classification Search
CPC ............... G06F 17/30948; G06F 17/30; G06F 17/3053; G06F 11/30; G06F 11/079; G06N 5/04; G06N 5/046; G06N 5/025; H04L 63/1425; H04L 63/1416; H04L 43/08
See application file for complete search history.

(56) References Cited

U.S. PATENT DOCUMENTS

| | | | |
|---|---|---|---|
| 7,574,740 B1 | 8/2009 | Kennis | |
| 7,627,543 B2 | 12/2009 | Lock et al. | |
| 8,918,883 B1 | 12/2014 | Boyle et al. | |
| 9,141,914 B2 | 9/2015 | Viswanathan et al. | |
| 2005/0203881 A1 | 9/2005 | Sakamoto et al. | |
| 2008/0215576 A1 | 9/2008 | Zhoa et al. | |
| 2009/0177642 A1* | 7/2009 | Chung et al. ........... | G06F 17/30 707/5 |
| 2010/0153316 A1 | 6/2010 | Duffield et al. | |
| 2011/0213788 A1 | 9/2011 | Zhoa et al. | |
| 2011/0231704 A1* | 9/2011 | Ge et al. ................. | G06F 11/07 714/26 |
| 2013/0110761 A1 | 5/2013 | Viswanathan et al. | |
| 2013/0219223 A1* | 8/2013 | Jiang et al. ............. | G06F 11/07 714/37 |
| 2014/0325643 A1 | 10/2014 | Bart et al. | |

(Continued)

*Primary Examiner* — Ann J Lo
*Assistant Examiner* — Scott R Gardner
(74) *Attorney, Agent, or Firm* — Polsinelli

(57) ABSTRACT

A method for ranking detected anomalies is disclosed. The method includes generating a graph based on a plurality of rules, wherein the graph comprises nodes representing metrics identified in the rules, edges connecting nodes where metrics associated with connected nodes are identified in a given rule, and edge weights of the edges each representing a severity level assigned to the given rule. The method further includes ranking nodes of the graph based on the edge weights. The method further includes ranking detected anomalies based on the ranking of the nodes corresponding to the metrics associated with the detected anomalies.

20 Claims, 6 Drawing Sheets

(56) References Cited

U.S. PATENT DOCUMENTS

| | | | |
|---|---|---|---|
| 2014/0372347 A1* | 12/2014 | Cohen et al. | G06F 11/079 706/12 |
| 2015/0033086 A1 | 1/2015 | Sasturkar et al. | |
| 2015/0046757 A1* | 2/2015 | Brew et al. | G06F 11/34 714/47.3 |
| 2016/0147583 A1* | 5/2016 | Simhon et al. | G06F 11/07 |
| 2017/0075749 A1* | 3/2017 | Ambichl et al. | G06F 11/079 |

* cited by examiner

RULE 1: CPU_UTILIZATION GREATER THAN 90% AND DISK_READ GREATER THAN 50MS, SEVERITY:10

RULE 2: QUEUE_LENGTH GREATER THAN 100 AND DISK_READ GREATER THAN 50MS, SEVERITY:8

RULE 3: DISK_WRITE GREATER THAN 100MS, SEVERITY:5

FIGURE 2

INTELLIGENT ANOMALY IDENTIFICATION AND ALERTING SYSTEM BASED ON SMART RANKING OF ANOMALIES

TECHNICAL FIELD

This disclosure relates in general to the field of computing and, more particularly, to intelligent alerting system based on smart ranking of anomalies.

BACKGROUND

Data centers are common place to computing, especially to cloud computing. Data centers generally has many commoditized resources such as processors, data storages, and even network links. The commoditized resources can fail or become overloaded. When a resource fails or becomes overloaded, it is important for an administrator or management system to be notified such that appropriate actions can be taken to ensure system up time, maintain quality of service requirements, and reduce further failures. Notifications can often be in a form of logs, metrics, or alerts. Typically, administrators are inundated by these notifications, which would normally include a large volume of data, including data reporting status information about resources in the data center. When data centers grow larger, so do the volume of notifications. It is extremely cumbersome and difficult for a human administrator to review all notifications, and management systems sometimes lack the intelligence to understand notifications and report of anomalies efficiently.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 2 shows an exemplary set of rules for generating alerts;

DETAILED DESCRIPTION OF EXAMPLE EMBODIMENTS

Overview

Figure 1:
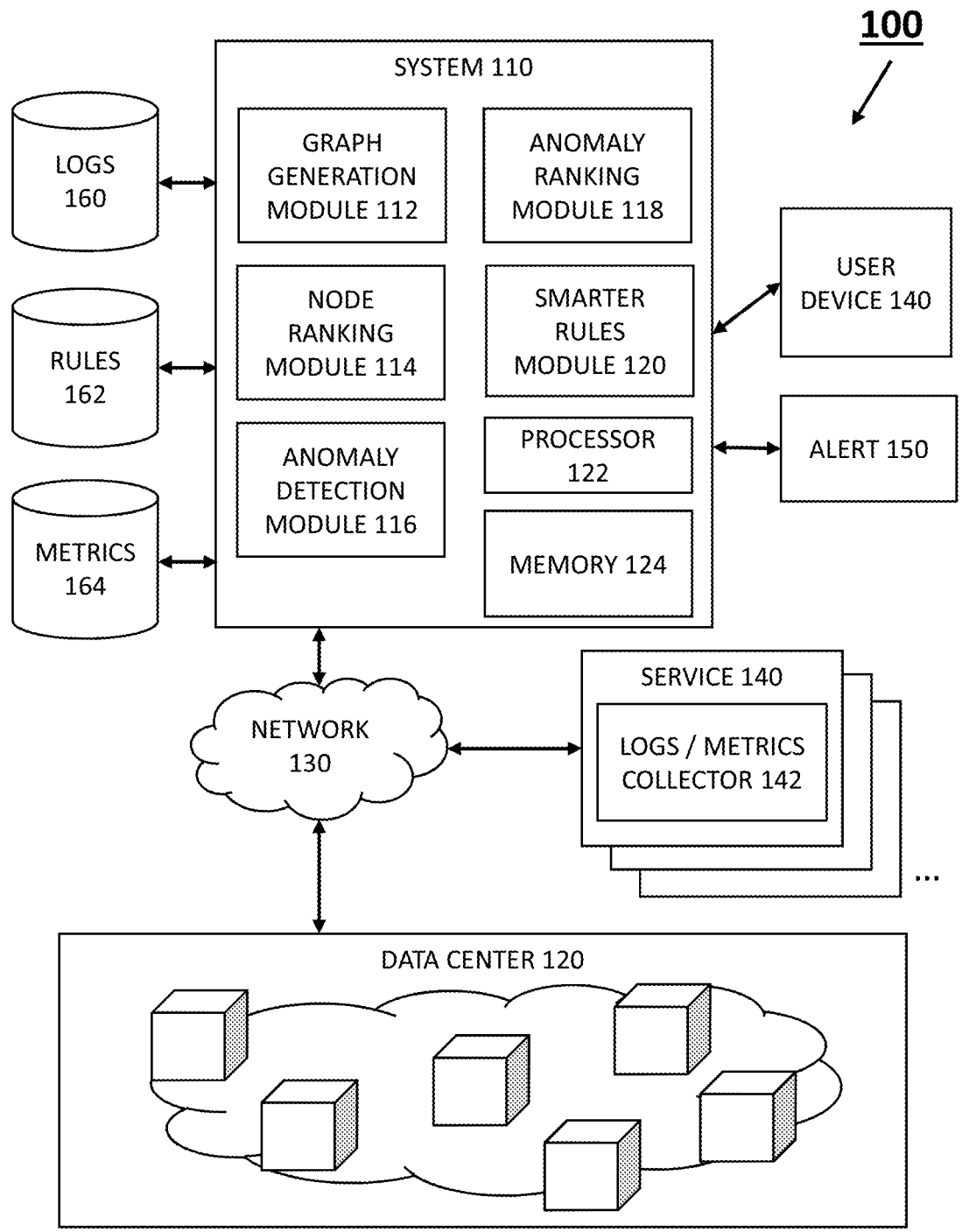
FIG. 1 shows an exemplary system for alerting, and identifying and/or ranking anomalies, according to some embodiments of the disclosure.

A method for ranking detected anomalies is disclosed. The method includes generating a graph based on a plurality of rules, wherein the graph comprises nodes representing metrics identified in the rules, edges connecting nodes where metrics associated with connected nodes are identified in a given rule (e.g., connected together in the same rule via one or more logical operations, identified in the same rule), and edge weights of the edges each representing a severity level assigned to the given rule. The method further includes ranking nodes of the graph based on the edge weights. The method further includes ranking detected anomalies based on the ranking of the nodes corresponding to the metrics associated with the detected anomalies.

In some embodiments, the method further comprises alerting an end user of the detected anomalies based on the ranking of the detected anomalies.

In some embodiments, the plurality of rules are defined by an administrator for checking whether certain metrics in the rules meet particular conditions. In some embodiments, the plurality of rules each comprises: at least one metric describing a state of one or more resources, and at least one condition, wherein each condition is defined for a corresponding metric.

In some embodiments, the detected anomalies are detected by observing for anomalous metrics and/or anomalous log through statistical analysis.

In some embodiments, edges are defined in the graph when two or more metrics and their corresponding conditions are connected in a given rule via a logical operation. In some embodiments, an edge is defined in the graph connecting a node to itself when a particular metric is not connected other metrics in a given rule. In some embodiments, edge weights are higher in value when a severity level is higher. In some embodiments, value for a given edge weight of a given edge connecting two nodes varies depending on a type of logical operation which connects the metrics corresponding to the two nodes in a given rule.

In some embodiments ranking nodes comprises: computing an importance value for a given node based on all edge weights of edges connected to the given node, and upon computing importance values for all nodes, ranking the nodes based on the importance values. In some embodiments, ranking nodes comprises: computing an influence value for a given node and treating the graph as a social graph, and upon computing influence values for all nodes, ranking the nodes based on the influence values.

System for carrying out the method is also disclosed herein. Computer-readable storage medium storing instructions that, when executed by one or more processors, causes the one or more processors to carry out the method is also disclosed herein.

Example Embodiments

Understanding Data Center, Logs, and Metrics

A data center has many different types of resources (virtual or physical) operating together to provide services to users and clients. To allow an administrator to monitor the state or health of a data center, logs logging activity or events in the data center and metrics representing certain performance or state of resources are reported to an administrator. Since there are many resources in a data center, administrators are often inundated with streams of logs and metrics, making it difficult for a human administrator to monitor and identify problems in the data center. When an administrator can not readily identify and perform actions to address problems before or soon after they occur, services running in the data center can suffer from limitations on performance, or worse yet, partial or total system failure. To address the issue, systems can implement one of two ways to help administrators determine if there are problems in the data center.

One way to make it easier for administrators to understand logs and metrics is to allow administrators to define rules that triggers alerts to be sent and/or displayed to the administrator. A rule-based alert can be generated when a metric meets a particular condition (e.g. CPU utilization>90%), and the metric is being monitored in real time. These rules can be in the form of a predefined threshold (i.e., condition) on a particular metric. An administrator no longer has to manually review logs for problems, and the rules can check for certain conditions in the metrics for the administrator. The workload to be done by the administrator is greatly reduced. However, this approach can be problematic in some scenarios. The effectiveness of rule-based alerts largely depends on the domain expertise of the administrator. If rules are defined narrowly, rules may not capture all potential problems in the data center. If rules are defined broadly, rules may generate too many alerts. Given the scale of the data center (or multiple data centers) being monitored, the administrator can be overwhelmed with the large number of alerts at any given instant.

Another way to make it easier for administrators to understand logs and metrics is the use of anomaly detection. Anomaly detection monitors a data center by identifying (statistical) anomalies in the logs or metrics. Specifically, anomaly detection automatically identifies deviation from normal behavior for the metrics being monitored. When deviation or anomalous behavior is identified, an alert is generated for an administrator. Whereas rule-based alerting leverages the domain knowledge and expertise of the administrator who is responsible for defining those rules, anomaly detection leverages machine learning and statistical analysis to understand normal behavior and attempt to identify abnormal patterns in the logs and metrics. However, one downside of anomaly detection is that anomaly detection based alerting can potentially lead to many false alarms since they typically do not incorporate domain specific intelligence. False alarms waste administrator time and effort in addressing problems that do not exist, or worst yet, false alarms obfuscate actual problems in the data center.

System for Anomaly Ranking

Using either rule-based alerting or anomaly detection can be problematic. To address some of these issues, the present disclosure describes a system which can rank anomaly-related alerts so that an administrator can prioritize them and react to alerts in a timely and efficient manner. For instance, a mechanism can be implemented to combine domain specific information with intelligent anomaly detection alerting systems to rank anomaly-related alerts. Moreover, some mechanisms based on smarter rules can be implemented to reduce noisy alerts.

FIG. 1 shows an exemplary system for alerting, and identifying and/or ranking anomalies, according to some embodiments of the disclosure. The network environment 100 comprises a system 110 for identifying and/or ranking anomalies in a data center 120. The system 110 can communicate with various resources (illustrated as cubes) via a network 130. Each resource or manager(s) of said resources can be associated with one or more services 140 implementing a logs and/or metrics collector 142 for providing real-time logs and/or metrics associated with the resources to the system 110. The system 110 can also communicate with the one or more services 140, via the network 130, or via another network not shown in FIG. 1. The logs and/or metrics collector 142 can provide real-time logs and/or metrics associated with resources in data center 120, and the data center 120 in part or as a whole, to the system 110. In order to generate logs and/or metrics related to the data center 120, the services 140 could be communicatively connected to the data center 120 directly, via the network 130, or via another network not shown in FIG. 1.

In at least one embodiment, the system 110 can include a graph generation module 112, a node ranking module 114, an anomaly ranking module 118. In some cases, the system 116 may further include an anomaly detection module 116. In some cases the anomaly detection module 116 is provided by a different entity. The system 110 can be implemented for alerting based on smarter rules (with or without anomaly ranking functionalities), where in such embodiments, the system can include a smarter rules module 120 for implementing improved anomaly identification and/or improved alerting. The system 110 can also include at least one processor 122 and at least one memory element 124, along with any other suitable hardware to enable its intended functionality. The system 110 may also include an interface (not shown in FIG. 1) to enable communication with a user device 140, which may be operated by a user such as an administrator. As a result of performing functionality described herein, the system 110 can produce an alert 150. Optionally, in some embodiments, various repositories may be associated with the system 110, including, but not limited to, a logs repository 160 for storing logs, a rules repository 162 for storing rules (e.g., rules defined by an administrator, rules defined by smarter rules module 120), and a metrics repository 164 for storing metrics.

Elements of FIG. 1 may be coupled to one another through one or more interfaces employing any suitable connections (wired or wireless), which provide viable pathways for network communications. Additionally, one or more of these elements of FIG. 1 may be combined, divided, or removed from the architecture based on particular configuration needs. Network environment 100 may include a configuration capable of transmission control protocol/internet protocol (TCP/IP) communications for the transmission and/or reception of packets in the network. Network environment 100 may also operate in conjunction with a user datagram protocol/IP (UDP/IP), any other suitable protocol, or any suitable combination thereof where appropriate and based on particular needs. For purposes of illustrating the techniques of the system 110, it is important to understand the activities that may be present in network environment 100. The following foundational information may be viewed as a basis from which the present disclosure may be properly explained. Such information is offered for purposes of explanation only and, accordingly, should not be construed in any way to limit the broad scope of the present disclosure and its potential applications.

Turning, again, to the infrastructure of FIG. 1, network 130 represents a series of points or nodes of interconnected communication paths for receiving and transmitting packets of information that propagate through the network environment 100. The network 130 offers a communicative interface between various parts seen in FIG. 1, and may include any type or topology of one or more networks such as a local area network (LAN), wireless local area network (WLAN), metropolitan area network (MAN), virtual local area network (VLAN), Intranet, Extranet, wide area network (WAN) such as the Internet, virtual private network (VPN), any other appropriate network configuration, or any suitable combination thereof that facilitates communications in the network environment 100. The network 130 can comprise any number of hardware or software elements coupled to (and in communication with) each other through a communications medium. In at least some embodiments, other elements in the network environment 100 may also communicate via one or more networks such as those described with reference to the network 130. For ease of illustration, however, not all elements of FIG. 1 are depicted with communication lines traversing the network 130 (e.g., logs repository 160, rules repository 162, metrics repository 164, user device 140, etc.). In the network 130, network traffic, which could include packets, frames, signals, cells, datagrams, protocol data units (PDUs), data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). A packet is a unit of data for communicating information in a network, and can be routed between a source node (e.g., the system 110) and a destination node (e.g., storage nodes 122(1)-122(N)) via the network 130. A packet includes, but is not limited to, a source network address, a destination network address, and a payload containing the information to be communicated. By way of example, these network addresses can be Internet Protocol (IP) addresses in a TCP/IP messaging protocol. Information is generally represented by data and, as used herein, 'data' refers to any type of binary, numeric, voice, video, media, textual, or script data, or any type of source or object code, or any other suitable information in any appropriate format that may be communicated from one point to another in electronic devices and/or networks.

Services 140 can be configured to provide system metrics of the resources in the data center 120 to the system 110. System metrics can include information related to or summarizing current system state and/or activity including, but not limited to, number of on-going client operations, current central processing unit (CPU) utilization, disk usage or load on the storage nodes, available network bandwidth, remaining disk input/output operations per second (IOPS), remaining disk bandwidth, etc. In at least one embodiment, these metrics can be pushed to the system 110 by the metrics collectors in real-time. The system 110 or services 140 may store the metrics in metrics repository 164, which may be internal to the system 110 or external (entirely or in part). In other embodiments, services 140 may store real-time system metrics in the metrics repository 164 without accessing the system 110.

In some cases, services 140 can be configured to provide logs logging events and activities in data center 120 to system 110. Logs can include information related to events, errors, device drivers, system changes, etc. In at least one embodiment, these logs can be pushed to the system 110 by the services 140 in real-time. The system 110 or services 140 may store the system logs in logs repository 160, which may be internal to the system 110 or external (entirely or in part). In other embodiments, services 140 may store real-time system logs in the logs repository 160 without accessing the system 110.

The system 110 can be implemented by one or more network elements in network environment 100. As used herein, the term 'network element' is meant to encompass servers, processors, modules, routers, switches, cable boxes, gateways, bridges, load balancers, firewalls, inline service nodes, proxies, or any other suitable device, component, element, or proprietary appliance operable to exchange information in a network environment. This network element may include any suitable hardware, software, components, modules, or interfaces that facilitate the operations thereof. This may be inclusive of appropriate algorithms and communication protocols that allow for the effective exchange of data or information.

In one implementation, the system 110 includes software or instructions in memory 124 (i.e., non-transitory computer-readable memory medium) to achieve (or to foster) anomaly identification, alerting, and/or anomaly ranking processes, as outlined herein. Note that in one example, the system 110 can have an internal structure (e.g., processor 122, memory element 124, network interface card, etc.) to facilitate some of the operations described herein. In other embodiments, these activities carried out by system 110 may be executed externally to the system 110, or included in some other network element to achieve this intended functionality. Alternatively, the 110 may include this software (or reciprocating software) that can coordinate with other network elements in order to achieve the operations, as outlined herein. In still other embodiments, one or several devices may include any suitable algorithms, hardware, software, firmware, components, modules or interfaces that facilitate the operations thereof.

In accordance with at least one embodiment of the present disclosure, the network environment 100 can provide improvements to the aforementioned issues associated with rules-based alerting systems or anomaly detection systems. Specific details on the functionalities of the various modules in system 110 are explained with FIGS. 2-6. Any one of the activities described herein can serve to make the alerting system more effective, thereby making it easier for an administrator to monitor and react to problems in a data center.

In some embodiments, the system 110 leverages rules that have already been predefined for generating alerts to rank detected anomalies. Phrased differently, the system 110 can decide which anomaly might be more important or ought to have higher priority by learning from and interpreting the rules in an intelligent manner. Specifically, the system 110 can rank the anomalies based on the rules (provided by the administrator or some other entity) represented as a graph and identifying the most influential nodes. As a result, the domain-specific knowledge and expertise that was "built in" to the rules are extrapolated and applied to ranking detected anomalies, such that an administrator can easily decide on which anomaly to act on first. In many cases, this can prioritize actions when there are multiple metrics showing anomaly at the same time. Note that anomaly detection generally identifies anomalous metrics at any given time. System 110 can rank alerts triggered by these anomalous metrics based on the priority or importance associated with these metrics. This scheme is unique because this technique learns from rules and applies that learning to ranking of anomalies, and other systems rank anomalies based on the probability of occurrence, or underlying system or network topology or hierarchy.

In some other embodiments, system 110 can reduce noise from alerts. For instance, anomaly detection systems can change thresholds of rules to make the rules smarter. In another instance, system 110 can combine rule-based alerting with anomaly detection based alerting methods. In this way, system 110 can combine domain knowledge with automatic anomaly detection methods to assist in anomaly identification and/or reduce noise from alerts.

Rules for Generating Alerts

To generate the priorities for the metrics, rules such as threshold-based rules can be used. Domain-specific expertise and knowledge can be learned from these threshold-based rules. These rules can be predefined by an administrator. To understand how system 110 can learn from rules, FIG. 2 shows an exemplary set of rules for generating alerts. These rules are typically defined by an administrator, but some rules can be generated using the smarter rules module 120 as well. The rules can be stored in the rules repository 162. For simplicity, three threshold-based rules are shown. Other kinds and examples rules are envisioned by the disclosure. Generally speaking, rules are defined by an administrator for checking whether certain metrics (e.g., metrics generated by a service about a data center 120) in the rules meet particular conditions. If the metric(s) meet the specified condition(s), the system 110 can generate an alert for the administrator. Such an alert may have a predefined severity level or value defined by the rule. Typically, an administrator would typically assign a higher severity level if the conditions indicate a more severe or urgent problem in the data center.

For instance, a rule can include at least one metric describing a state of one or more resources, and at least one condition, wherein each condition is defined for a corresponding metric. A metric and its corresponding condition is referred herein as a "metric-condition pair". A rule can have any combination or number of suitable "metric-condition pairs". As shown in FIG. 2, Rule 1 checks whether CPU Utilitization "cpu_utilization" (metric) is greater than 90% (condition). Rule 1 also checks whether Disk Read Latency "disk_read" (metric) is greater than 50 ms (condition). Furthermore, the two metric-condition pairs are connected in Rule 1 via an "AND" (logical operation). Accordingly, an alerting system would check to see if both metric-condition pairs in Rule 1 are met before triggering an alert. The alert generated based on Rule 1 can have a severity level or value of 10. As shown in FIG. 2, Rule 2 checks whether Queue Length "queue_length" (metric) is greater than 100 (condition). Rule 2 also checks whether disk_read (metric) is greater than 50 ms (condition). Furthermore, the two metric-condition pairs are connected in Rule 2 via an "AND" (logical operation). Accordingly, an alerting system would check to see if both metric-condition pairs in Rule 2 are met before triggering an alert. The alert generated based on Rule 2 can have a severity level or value of 8. Also shown in FIG. 2, Rule 3 checks whether Disk Write Latency "disk_write" (metric) is greater than 100 ms (condition). The metric-condition pair is not connected to anything else in Rule 3. Accordingly, an alerting system would check just whether disk_write is greater than 100 ms before triggering an alert. The alert generated based on Rule 3 can have a severity level or value of 5.

Generally speaking, a rule can have any number of metric-condition pairs (e.g., one or more metric-condition pairs). Any suitable combinations of metric-condition pairs can be defined in a rule. Furthermore, the metric-connection pairs in a given rule can be connected with each other via a variety of logical operations, e.g., "AND", "OR", "XOR", etc. While in some cases rules can be written in a different format/syntax, all rules can be written in an equivalent form where metric-condition pairs are connected by these logical operations.

Generating a Graph Based on the Rules

Using these rules, a graph generation module (e.g., graph generation module 112 of FIG. 1) can generate a graph with nodes representing the metric and edges representing the fact that the two metrics are connected by a rule defined by the administrator. The administrator while defining rules also defines the severity level or value of the alert corresponding to the rule. These severity levels or values can be captured by edge weights of the graph, the higher the severity level of the rule the larger/greater is the corresponding edge weight. Advantageously, this graph enables subsequent extraction and application of the domain specific knowledge and expertise that an administrator had when he/she defined the rules.

Figure 3:
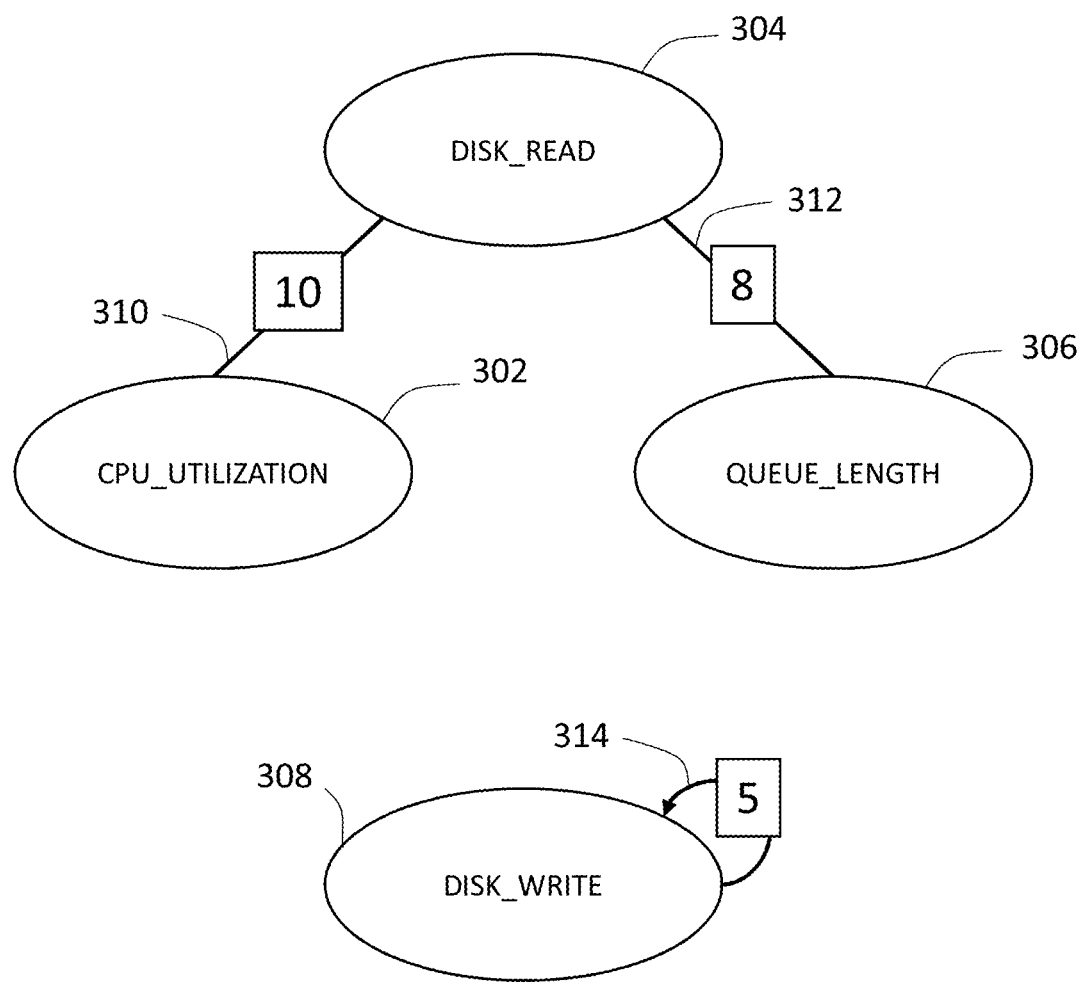
FIG. 3 shows an exemplary graph generated based on the set of rules shown in FIG. 2, according to some embodiments of the disclosure.

FIG. 3 shows an exemplary graph generated based on the set of rules shown in FIG. 2, according to some embodiments of the disclosure. This graph corresponds to the three rules shown in FIG. 2. Graphs can be generated based on other exemplary rules. The three rules in FIG. 2 identifies four different metrics: CPU Utilitization "cpu_utilization", Disk Read Latency "disk_read", Queue Length "queue_length", and Disk Write Latency "disk_write". Accordingly, the graph has four nodes: cpu_utilization node 302, disk_read node 304, queue_length node 306, and disk_write node 308. Edges are defined in the graph when two or more metrics and their corresponding conditions are connected in a given rule via a logical operation. Since Rule 1 connects [cpu_utilization, greater than 90%] and [disk_read, greater than 50 ms] (via an "AND" operation), an edge 310 connects cpu_utilization node 302 and disk_read node 304. Since Rule 2 connects [queue_length, greater than 100] and [disk_read, greater than 50 ms] (via an "AND" operation), an edge 312 connects queue_length node 306 and disk_read node 304. Rule 3 only has one metric-condition pair, and an edge 314 can be defined which originates from disk_write node 308 back to disk_write node 308. If there is only one-metric condition pair, the metric-condition pair is considered connected to itself. For example, the disk_write node is connected to a node which is itself (hence the edge which points back to the disk_write node 308).

Graphs are not limited to the example shown. In some cases, rules connect more than two metric-condition pairs. For instance, a rule may include [metric-condition-1] AND [metric-condition-2] AND [metric-condition-3]. In such a case, an edge can be defined per pairwise connection, e.g., an edge connecting [metric-condition-1] with [metric-condition-2], an edge connecting [metric-condition-1] with [metric-condition-3], and an edge connecting [metric-condition-2] with [metric-condition-3].

Edge weights corresponding to the edges (e.g., edge 310, 312, and 314) are higher in value when a severity level of the given rule connecting the metrics associated with the nodes is higher. The edge weight can be correlated to the severity level of the given rule. In one embodiment, the edge weight is equal to the severity level or value of the rule which connected the metrics. Accordingly, edge weight for edge 310 is 10 since Rule 1 connecting cpu_utilization and disk_read has a severity level or value of 10. Edge weight for edge 312 is 8, since Rule 2 connecting queue_length and disk_read has a severity level or value of 8. Edge weight for edge 314 is 5 since Rule 1 has a severity level or value of 5.

In some embodiments, the value for a given edge weight (or simply "the edge weight") of a given edge connecting two nodes varies depending on a type of logical operation which connects the metrics corresponding to the two nodes in a given rule. For instance, the edge weight may be higher if logical operation connecting the metrics is "AND", as opposed to "OR". The different edge weight can be computed using a multiplicative or additive factor. The multiplicative or additive factor can vary depending on the logical operation connecting the two metrics. Such a variation on the edge weight based on the logical operation may take into account that not all connections or logical operations should be valued the same way. At a high level, the edge weight represents how important a particular metric is in relation with another metric, and if the logical operation is an "OR", the relationship may be less important or weaker than the situation where the logical operation is an "AND".

Method for Ranking Anomalies

Once the graph is generated, it is possible to extract domain knowledge and expertise that is embedded in the rules mathematically. To extract this information, the nodes in the graph are ranked. Once the nodes have a ranking, i.e., once the metrics corresponding to the nodes have a ranking, detected anomalies of those metrics can also be ranked.

Figure 4:
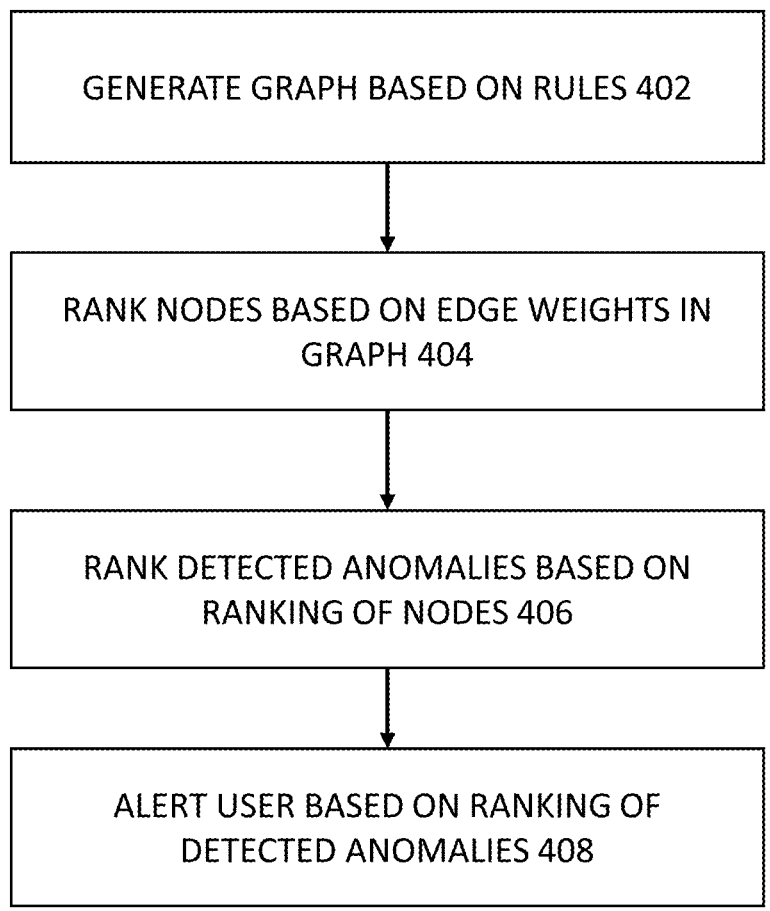
FIG. 4 is a flow diagram illustrating a method for ranking anomalies, according to some embodiments of the disclosure.

FIG. 4 is a flow diagram illustrating a method for ranking (detected) anomalies, according to some embodiments of the disclosure. The method is described with the network environment 100 of FIG. 1.

In task 402, graph generation module (e.g., graph generation module 112) can generate a graph based on a plurality of rules. This scheme is described in relation to FIG. 3. The graph comprises nodes representing metrics identified in the rules. Furthermore, the graph includes edges, where an edge connects (two) nodes where metrics associated with connected nodes are identified in a given rule (e.g., in the same rule). The edges signify that the metrics may be connected or related to each other since the metrics have been used in the same rule. The edge weights of the edges can each represent a severity level assigned to the given rule (e.g., the single rule where the metrics are identified or connected together). If the rule identifies only one metric (by itself, not connected to other metrics), an edge originates from the node associated with the one metric and points back to the node itself. The edge weight of such edge represent a severity level assigned to the rule in which the one metric is identified.

In task 404, node ranking module 114 can rank nodes of the graph based on the edge weights. In one embodiment, to evaluate the rank of each of these nodes in the graph, a value is computed based on the sum of edge weights of all the edges connected to that node. Based on the example shown in FIG. 3, a "score" can be computed for each node as follows:

Rank(disk_read)=10+8=18
Rank(cpu_utilization)=10
Rank(queue_length)=8
Rank(disk_write)=5

In other words, the node ranking module 114 can compute an importance value for a given node based on all edge weights of edges connected to the given node. For instance, the importance value can be a sum of all edge weights. The importance value can be a weighted sum of all edge weights (if edge weights have a corresponding weight value that can be used, e.g., a weight value which corresponds to the logical operation that connects the metrics). The importance value can be a product of all edge weights (i.e., computed by multiplying all edge weights together). The importance value can be a mean/mode/median value of all edge weights.

The node ranking module 114 can, upon computing importance values for all nodes, rank the nodes based on the importance values. For instance, the nodes can be sorted from highest to lowest importance values. The ranking can be higher if the importance value is higher. Based on the example above, the ranking of the nodes (highest importance value to lowest importance value) is as follows:

1. disk_read
2. cpu_utilization
3. queue_length
4. disk_write

Other ranking schemes for nodes can be used. For instance, thresholds can be applied to the importance values to sort the nodes into different bins having different ranking levels (and thresholds). For instance, the ranking of the nodes can be as follows:

1. SEVERE [metrics having importance value of 10 or more]: disk_read
2. WARNING [metrics having importance value of 6 or more but less than 10]: cpu_utilization, queue_length
3. ALERT [metrics having importance value of less than 6]: disk_write It is also possible to apply other schemes to identify most influential nodes the graph (consider the graph generated from the rules as a social graph with weighted edges). The node ranking module 114 can compute an influence value for a given node and treat the graph as a social graph, and upon computing influence values for all nodes, the node ranking module 114 can rank the nodes based on the influence values.

This ranking of nodes can be used for ranking anomalies identified/detected in these metrics corresponding to the nodes. At a given time, anomalous behavior can be detected in one or more of the metrics mentioned. For example, the multiple alerts that are triggered by anomalies detected in different metrics can then be sorted or ranked based on the ranking of the nodes. In task 406, anomaly ranking module 118 can rank detected anomalies (e.g., detected by anomaly detection module 116) based on the ranking of the nodes corresponding to the metrics associated with the detected anomalies. For instance, if anomalous behavior is detected in disk_read and anomalous behavior is detected in disk_write, the two anomalous behavior (and alerts triggered therefrom) can have different ranking. The anomalous behavior for disk_read can be ranked higher than the anomalous behavior for disk_write. Generally speaking, the detected anomalies are detected by observing for anomalous metrics and/or anomalous log through statistical analysis.

In task 406, system 110 can alert an end user of the detected anomalies based on the ranking of the detected anomalies. The ranking of detected anomalies can help an administrator decide more easily which detected anomaly is more important/severe/urgent when more than one anomaly is predicted/present at a given time. For instance, the anomalies can be displayed in an order according to the ranking of the detected anomalies. The anomalies can be displayed with visual cues which represent the ranking of the detected anomalies. The anomalies can be transmitted differently depending on the ranking of the detected anomalies (e.g., via different modes of communication). For instance, if the ranking of the detected anomaly is high, an administrator may be notified via phone rather than a text message or email. In another instance, if the ranking of the detected anomaly is high, an administrator may be notified by an audible alarm. In yet another instance, if the ranking of the detected anomaly is high, a different administrator may be notified. In yet another instance, if the ranking of the detected anomaly is high, a different action may be triggered.

Smart Thresholding for Rules

Figure 5:
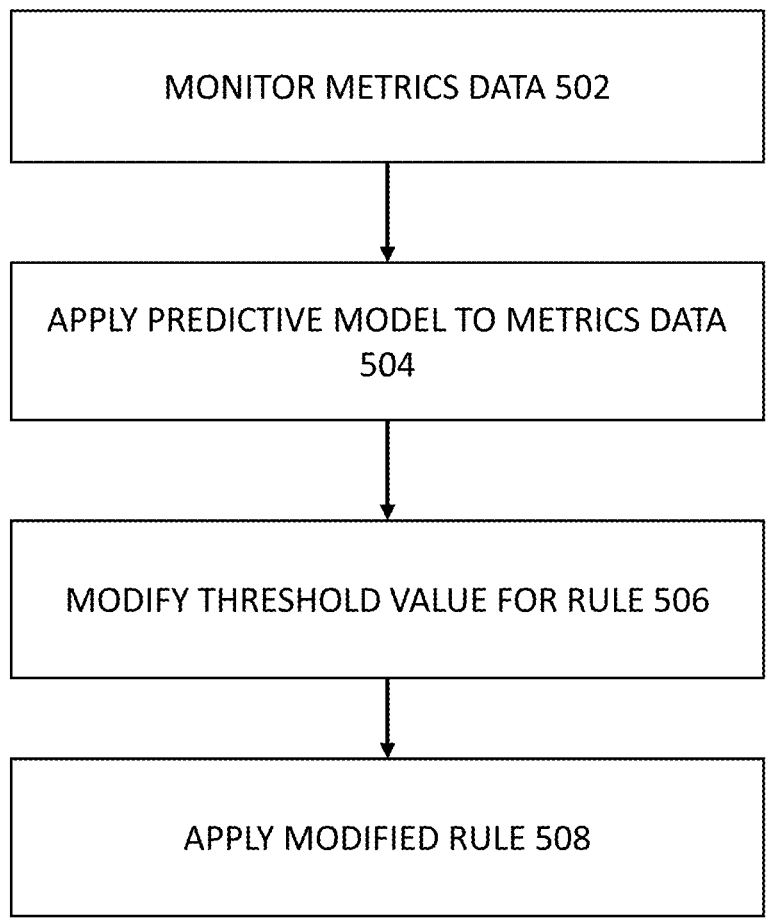
FIG. 5 is a flow diagram illustrating a method for smart thresholding, according to some embodiments of the disclosure.

FIG. 5 is a flow diagram illustrating a method for smart thresholding, according to some embodiments of the disclosure. The tasks in this method can be carried out by smarter rules module 120 of FIG. 1. At task 502, the incoming metric data (e.g. CPU_utilization, disk_read, disk_write, queue_length, etc.) is monitored. At task 504, a predictive model is applied to the monitored metric data to learn the normal behavior of the metric. At task 506, based on the output of the predictive model, a threshold value for a rule for generating alerts can be modified. Accordingly, smarter rules module 120 can generate dynamic rules for alerts. In task 508, the modified rule can be applied to the metrics to generate/trigger alerts which are smarter and less noisy when/if the threshold value can be improved.

For instance, suppose the administrator creates a rule-based alert that states that if the CPU utilization (metric) goes above 90% (threshold value for the condition) then send an alert. For smart thresholding, the system learns how CPU utilization changes over time by using predictive models (e.g.: Holt-Winters, ARIMA) on time-series data representing CPU utilization over time. Suppose the utilization reaches 91% every Monday and is less than 90% rest of the time then smart rules module 120 can use the output of the predictive model to modify or change the threshold value to 91% instead of 90% on every Monday. As a result, alerts based on the modified rules can be less noisy (better at identifying and alerting of issues in the data center).

Smarter Rules by Combining Rules and Anomaly Detection

Figure 6:
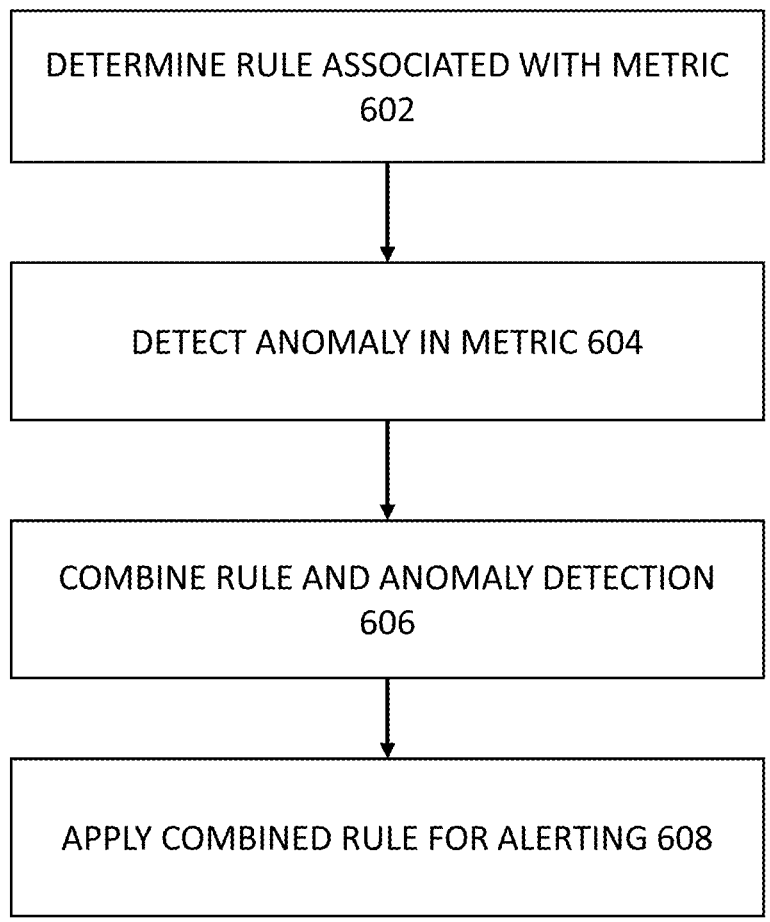
FIG. 6 is a flow diagram illustrating a method for combining rules and anomaly detection when triggering an alert, according to some embodiments of the disclosure.

FIG. 6 is a flow diagram illustrating a method for combining rules and anomaly detection when triggering an alert, according to some embodiments of the disclosure. The tasks in this method can be carried out by smarter rules module 120 of FIG. 1. Such a method can also help make alerts less noisy (better at identifying and alerting of issues in the data center), by making sure alerts are generated when a rule is met and when an anomaly is detected. Phrased differently, the method can reduce noise from alerts triggered by rule-based alerts by combining it with anomaly detection and vice versa.

In task 602, a rule associated with a metric is determined. This rule can be predefined by an administrator, or it can be a rule defined by the smart rules module 120 in a manner described herein. In task 604, an anomaly detection module detects an anomaly in the metric. In task 606, the rule and whether the anomaly is detected is combined in a combined rule for triggering alerts ("combined rule for alerting"). In task 608, the combined rule for alerting is applied. If the condition specified in the rule for the metric from task 602 is met and in task 602, the anomaly is detected in the metric, the combined rule triggers an alert for an administrator.

For instance, suppose the administrator wants to create an alert on CPU utilization. The administrator can do this by applying anomaly detection based alerting rule on this metric. At the same time, the administrator also knows from experience that if the utilization exceeds 90% in general then there is a chance of failure occurring in the system. The system can allow the administrator so specify and apply a new rule that combines both the threshold based rule and anomaly detection based alert by combing the two rules with 'AND' condition. For example, in this case the rule would be: If "CPU utilization is greater than 90%" AND "Anomaly detected in CPU utilization" then trigger an alert. Such a rule can be more robust and less noisy.

Variations and Implementations

Since embodiments of the methods described herein involve alerting, and identifying anomalies, and/or ranking anomalies in a data center, a functional entity performing embodiments of these methods is referred to herein as a "system" or "system for alerting, and identifying and/or ranking anomalies". Such a functional entity could be implemented within any network element or distributed among a plurality of network elements associated with a distributed computing system. For example, one or more of compute servers that may form a networked cluster in the distributed computing system to which the computing resources are connected to may be configured to implement the anomaly identification, alerting, and/or anomaly ranking features.

Within the context of the disclosure, a cloud of host servers generally includes host servers communicably connected over a network. A network used herein represents a series of points, nodes, or network elements of interconnected communication paths for receiving and transmitting packets of information that propagate through a communication system. A network offers communicative interface between sources and/or hosts, and may be any local area network (LAN), wireless local area network (WLAN), metropolitan area network (MAN), Intranet, Extranet, Internet, WAN, virtual private network (VPN), or any other appropriate architecture or system that facilitates communications in a network environment depending on the network topology. A network can comprise any number of hardware or software elements coupled to (and in communication with) each other through a communications medium.

As used herein in this Specification, the term 'network element' or parts shown in FIGS. 1 and 4-9, is meant to encompass suitable elements such as servers (physical or virtually implemented on physical hardware), machines (physical or virtually implemented on physical hardware), end user devices, routers, switches, cable boxes, gateways, bridges, loadbalancers, firewalls, inline service nodes, proxies, processors, modules, or any other suitable device, component, element, proprietary appliance, or object operable to exchange, receive, and transmit information in a network environment. These network elements or parts shown in FIGS. 1 and 4-9 may include any suitable hardware, software, components, modules, interfaces, or objects that facilitate the virtual machine placement operations thereof. This may be inclusive of appropriate algorithms and communication protocols (which can be carried out by one or more processors) that allow for the effective exchange of data or information.

In one implementation, the anomaly identification, alerting, and/or anomaly ranking system and the modules therein described herein may include software to achieve (or to foster) the functions discussed herein for carrying out virtual machine placement optimization where the software is executed on one or more processors to carry out the functions. This could include the implementation of instances of graph generation module, node ranking module, anomaly detection module, anomaly ranking module, and/or any other suitable element that would foster the activities discussed herein. Additionally, each of these elements can have an internal structure (e.g., one or more suitable processors, one or more memory elements, processor 122 of FIG. 1, memory 124 of FIG. 1, etc.) to facilitate some of the operations described herein. In other embodiments, these functions for anomaly identification, alerting, and/or anomaly ranking may be executed externally to these elements, or included in some other network element to achieve the intended functionality. Alternatively, the anomaly identification, alerting, and/or anomaly ranking system and the modules therein may include software (or reciprocating software) that can coordinate with other network elements in order to achieve the functions described herein. In still other embodiments, one or several devices may include any suitable algorithms, hardware, software, components, modules, interfaces, or objects that facilitate the operations thereof.

In certain example implementations, the anomaly identification, alerting, and/or anomaly ranking functions outlined herein may be implemented by logic encoded in one or more non-transitory, tangible media (e.g., embedded logic provided in an application specific integrated circuit [ASIC], digital signal processor [DSP] instructions, software [potentially inclusive of object code and source code] to be executed by one or more processors, or other similar machine, etc.). In some of these instances, one or more memory elements can store data used for the operations described herein. This includes the memory element being able to store instructions (e.g., software, code, etc.) that are executed to carry out the activities described in this Specification. The memory element is further configured to store logs, rules, metrics, etc. The processor can execute any type of instructions associated with the data to achieve the operations detailed herein in this Specification. In one example, the processor could transform an element or an article (e.g., data) from one state or thing to another state or thing. In another example, the activities outlined herein may be implemented with fixed logic or programmable logic (e.g., software/computer instructions executed by the processor) and the elements identified herein could be some type of a programmable processor, programmable digital logic (e.g., a field programmable gate array [FPGA], an erasable programmable read only memory (EPROM), an electrically erasable programmable ROM (EEPROM)) or an ASIC that includes digital logic, software, code, electronic instructions, or any suitable combination thereof.

As will be appreciated by one skilled in the art, aspects of the present disclosure, in particular the functionality of the anomaly identification, alerting, and/or anomaly ranking system described herein, may be embodied as a system, a method or a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor, e.g. a microprocessor, of a computer. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded to the existing devices and systems (e.g. to the existing network elements such as the existing servers, routers, switches, various control nodes, etc.) or be stored upon manufacturing of these devices and systems.

Any of these elements (e.g., the network elements, etc.) can include memory elements for storing information to be used in achieving anomaly identification, alerting, and/or ranking functions, as outlined herein. Additionally, each of these devices may include a processor that can execute software or an algorithm to perform the activities as discussed in this Specification. These devices may further keep information in any suitable memory element [random access memory (RAM), ROM, EPROM, EEPROM, ASIC, etc.], software, hardware, or in any other suitable component, device, element, or object where appropriate and based on particular needs. Any of the memory items discussed herein should be construed as being encompassed within the broad term 'memory element.' Similarly, any of the potential processing elements, modules, and machines described in this Specification should be construed as being encompassed within the broad term 'processor.' Each of the network elements can also include suitable interfaces for receiving, transmitting, and/or otherwise communicating data or information in a network environment.

Additionally, it should be noted that with the examples provided above, interaction may be described in terms of two, three, or four network elements or parts shown in FIG. 1. However, this has been done for purposes of clarity and example only. In certain cases, it may be easier to describe one or more of the functionalities of a given set of flows by only referencing a limited number of network elements. It should be appreciated that the systems described herein are readily scalable and, further, can accommodate a large number of components, as well as more complicated/sophisticated arrangements and configurations. Accordingly, the examples provided should not limit the scope or inhibit the broad techniques of anomaly identification, alerting, and/or anomaly ranking, as potentially applied to a myriad of other architectures.

It should also be noted that many of the previous discussions may imply a single client-server relationship. In reality, there is a multitude of servers in the delivery tier in certain implementations of the present disclosure. Moreover, the present disclosure can readily be extended to apply to intervening servers further upstream in the architecture, though this is not necessarily correlated to the 'm' clients that are passing through the 'n' servers. Any such permutations, scaling, and configurations are clearly within the broad scope of the present disclosure.

It is also important to note that the steps in the FIG. 4-6 illustrate only some of the possible scenarios that may be executed by, or within, the anomaly identification, alerting, and/or anomaly ranking system described herein. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by anomaly identification, alerting, and/or anomaly ranking system in that any suitable arrangements, chronologies, configurations, and timing mechanisms may be provided without departing from the teachings of the present disclosure.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

Although the claims are presented in single dependency format in the style used before the USPTO, it should be understood that any claim can depend on and be combined with any preceding claim of the same type unless that is clearly technically infeasible.

What is claimed is:

1. A method for ranking detected anomalies, the method comprising:
    defining a plurality of rules;
    generating a graph of the plurality of rules, wherein:
        at least one first rule of the rules includes a single metric and a severity level for when a condition of the single metric is satisfied, and
        at least one second rule of the rules includes a pair of metrics, and a severity level for when conditions of the pair of metrics are both satisfied;
    the generating comprising:
        creating a plurality of nodes, each of the nodes corresponding to a metric of the plurality of rules;
        connecting, for each node corresponding to the single metric of each of the first rules, the corresponding each node to itself with an edge;
        connecting, for each pair of metrics of each of the second rules, the corresponding pair of nodes with edges;
        assigning each of the edges with an edge weight corresponding to the severity level of the rule that defined the edge;
    the severity level of each of the rules being selected from within a continuous range;
    ranking the nodes of the graph based on the edge weights;
    detecting anomalies by comparing system metrics relative to the rules; and
    ranking detected anomalies based on the ranking of the nodes corresponding to the metrics associated with the detected anomalies;
    wherein the defining occurs before the detecting.

2. The method of claim 1, further comprising:
    alerting an end user of the detected anomalies based on the ranking of the detected anomalies.

3. The method of claim 1, wherein the plurality of rules are defined by an administrator.

4. The method of claim 1, wherein the plurality of rules each comprises:
    at least one metric describing a state of one or more resources; and
    at least one condition, wherein each condition is defined for a corresponding metric.

5. The method of claim 1, wherein the detected anomalies are detected by observing for anomalous metrics and/or anomalous log through statistical analysis.

6. The method of claim 1, wherein edges are defined in the graph when two or more metrics and their corresponding conditions are connected in a given rule via a logical operation.

7. The method of claim 1, wherein edge weights are higher in value when a severity level is higher.

8. The method of claim 1, wherein value for a given edge weight of a given edge connecting two nodes varies depending on a type of logical operation which connects metrics corresponding to the two nodes.

9. The method of claim 1, wherein ranking nodes comprises:
    computing an importance value for a given node based on all edge weights of edges connected to the given node; and
    upon computing importance values for all nodes, ranking the nodes based on the importance values.

10. A computer-readable non-transitory medium comprising one or more instructions, for identifying anomalies and alerting, that when executed on a processor configure the processor to perform one or more operations comprising:
    defining a plurality of rules;
    generating a graph of the plurality of rules, wherein:
        at least one first rule of the rules includes a single metric and a severity level for when a condition of the single metric is satisfied, and
        at least one second rule of the rules includes a pair of metrics, and a severity level for when conditions of the pair of metrics are both satisfied;
    the generating comprising:
        creating a plurality of nodes, each of the nodes corresponding to a metric of the plurality of rules;
        connecting, for each node corresponding to the single metric of each of the first rules, the corresponding each node to itself with an edge;
        connecting, for each pair of metrics of each of the second rules, the corresponding pair of nodes with edges;
        assigning each of the edges with an edge weight corresponding to the severity level of the rule that defined the edge;
    the severity level of each of the rules being selected from within a continuous range;
    ranking the nodes of the graph based on the edge weights;
    detecting anomalies by comparing system metrics relative to the rules; and
    ranking detected anomalies based on the ranking of the nodes corresponding to the metrics associated with the detected anomalies;
    wherein the defining occurs before the detecting.

11. The medium of claim 10, wherein the operations further comprise:
    alerting an end user of the detected anomalies based on the ranking of the detected anomalies.

12. The medium of claim 10, wherein the operations further comprise:
    assigning higher edge weight values when a severity level is higher.

13. The medium of claim 10, wherein the operations further comprise:
    varying edge weight values based on a type of logical operation connecting metrics of nodes.

14. A system, comprising:
    a non-transitory computer readable media storing instructions;
    a processor programmed to cooperate with the instructions to perform operations comprising:
        defining a plurality of rules;
        generating a graph of the plurality of rules, wherein:
            at least one first rule of the rules includes a single metric and a severity level for when a condition of the single metric is satisfied, and
            at least one second rule of the rules includes a pair of metrics, and a severity level for when conditions of the pair of metrics are both satisfied;
        the generating comprising:
            creating a plurality of nodes, each of the nodes corresponding to a metric of the plurality of rules;
            connecting, for each node corresponding to the single metric of each of the first rules, the corresponding each node to itself with an edge;
            connecting, for each pair of metrics of each of the second rules, the corresponding pair of nodes with edges;
            assigning each of the edge with an edge weight corresponding to the severity level of the rule that defined the edge;

the severity level of each of the rules being selected from within a continuous range;

ranking the nodes of the graph based on the edge weights;

detecting anomalies by comparing system metrics relative to the rules; and ranking detected anomalies based on the ranking of the nodes corresponding to the metrics associated with the detected anomalies;

wherein the defining occurs before the detecting.

15. The system of claim 14, the operations further comprising:

alerting an end user of the detected anomalies based on the ranking of the detected anomalies.

16. The system of claim 14, wherein the plurality of rules are defined by an administrator.

17. The system of claim 14, wherein the plurality of rules each comprises:

at least one metric describing a state of one or more resources; and at least one condition, wherein each condition is defined for a corresponding metric.

18. The system of claim 14, wherein the detected anomalies are detected by observing for anomalous metrics and/or anomalous log through statistical analysis.

19. The system of claim 14, wherein edges are defined in the graph when two or more metrics and their corresponding conditions are connected in a given rule via a logical operation.

20. The system of claim 14, wherein edge weights are higher in value when a severity level is higher.

* * * * *